US007268525B2

United States Patent
Ishii et al.

(10) Patent No.: US 7,268,525 B2
(45) Date of Patent: Sep. 11, 2007

(54) BUCK-BOOST CONVERTER

(75) Inventors: Takuya Ishii, Osaka (JP); Masato Yoshida, Kanagawa (JP); Mikio Motomori, Osaka (JP); Jun-ichiro Hara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/527,441

(22) Filed: Sep. 27, 2006

(65) Prior Publication Data

US 2007/0075687 A1   Apr. 5, 2007

(30) Foreign Application Priority Data

Sep. 30, 2005   (JP) .............................. 2005-286218

(51) Int. Cl.
    *G05F 1/575*   (2006.01)
(52) U.S. Cl. ...................................... 323/282; 323/283
(58) Field of Classification Search ............... 323/222, 323/224, 282, 283, 284, 285, 351
    See application file for complete search history.

(56) References Cited

U.S. PATENT DOCUMENTS

| 4,974,141 | A | * | 11/1990 | Severinsky et al. ............ 363/81 |
| 5,565,761 | A | * | 10/1996 | Hwang ......................... 323/222 |
| 5,929,620 | A | * | 7/1999 | Dobkin et al. ................ 323/288 |
| 6,166,527 | A | * | 12/2000 | Dwelley et al. ............... 323/222 |
| 6,342,822 | B1 | * | 1/2002 | So .............................. 332/109 |
| 6,348,781 | B1 | * | 2/2002 | Midya et al. ................. 323/224 |
| 6,677,734 | B2 | * | 1/2004 | Rothleitner et al. ......... 323/259 |
| 6,683,797 | B2 | * | 1/2004 | Zaitsu et al. ................... 363/16 |
| 6,788,033 | B2 | * | 9/2004 | Vinciarelli .................... 323/225 |
| 6,946,823 | B2 | * | 9/2005 | Huang et al. ................. 323/282 |
| 7,157,888 | B2 | * | 1/2007 | Chen et al. ................... 323/224 |

FOREIGN PATENT DOCUMENTS

| JP | 11-299229 | A | * | 10/1999 |
| JP | 2005-198411 | A | * | 7/2005 |

* cited by examiner

*Primary Examiner*—Adolf Berhane
(74) *Attorney, Agent, or Firm*—McDermott Will & Emery LLP

(57) ABSTRACT

A buck-boost converter includes: a buck converter section including a first switch, a first rectifier, and an inductor; a boost converter section sharing the inductor and including a second switch, a second rectifier, and a smoothing circuit; and a control circuit for generating and outputting a first driving signal for opening and closing the first switch and a second driving signal for opening and closing the second switch. The control circuit includes: an error amplifier circuit for amplifying an error between an output value from the smoothing circuit and a predetermined voltage value to thereby generate and output an error signal; an oscillator circuit for generating and outputting a triangular wave signal having a predetermined cycle; a compensatory signal generation circuit for generating and outputting a compensatory signal, which oscillates in a cycle that is at least twice the cycle of the triangular wave signal; a control signal generation circuit for adding together the error signal and the compensatory signal to thereby generate and output a control signal; and a comparator circuit for comparing the triangular wave signal with the control signal to generate and output the first or second driving signal.

13 Claims, 11 Drawing Sheets

BUCK-BOOST CONVERTER

CROSS-REFERENCE TO RELATED APPLICATION

The disclosure of Japanese Patent Application No. 2005-286218 filed on Sep. 30, 2005 including specification, drawings and claims is incorporated herein by reference in its entirety.

BACKGROUND OF THE INVENTION

The present invention relates to a non-isolated buck-boost converter for converting an input DC voltage to a predetermined output voltage.

In a power supply circuit which receives a DC voltage (hereinafter referred to as an "input DC voltage") from a DC power supply and outputs a DC voltage (hereinafter referred to as an "output DC voltage") as a DC power supply voltage for various kinds of electronic circuits, a buck-boost converter is used when the input DC voltage varies with respect to the predetermined output DC voltage. Such a buck-boost converter is described in Japanese Laid-Open Publication No. 11-299229, for example.

Hereinafter, with reference to FIG. 12, the buck-boost converter described in the above-mentioned publication will be discussed as a conventional example. FIG. 12 illustrates the circuit configuration of the buck-boost converter of the conventional example. As shown in FIG. 12, the conventional buck-boost converter includes: a buck converter section 20, which includes a first switch 2, a first diode 3, and an inductor 4; a boost converter section 25, which shares the inductor 4 and includes a second switch 5, a second diode 6, and a capacitor 7; and a control circuit 30, which generates and outputs a first driving signal DR1 for opening and closing the first switch 2 and a second driving signal DR2 for opening and closing the second switch 5.

In the buck converter section 20, the input terminal of the first switch 2 is connected to an input DC power supply 1, such as a DC battery, which provides a voltage Vi, while the output terminal of the first switch 2 is connected in series with the first diode 3, and this series circuit is connected in parallel with the input DC power supply 1. The inductor 4 is connected to the junction of the first switch 2 and the first diode 3.

In the boost converter section 25, the second switch 5 and the second diode 6 are connected in series with each other, and this series circuit is connected in parallel with the capacitor 7. The inductor 4, which is shared with the buck converter section 20, is connected to the junction of the second switch 5 and the second diode 6. From the junction of the second diode 6 and the capacitor 7, an output DC voltage Vo is output to supply power to various kinds of electronic circuits (not shown).

The control circuit 30 includes an error amplifier circuit 31, an offset circuit 32, an oscillator circuit 33, a first comparator 34, and a second comparator 35. The error amplifier circuit 31 detects the output DC voltage Vo and produces a first control signal Ve obtained by amplifying an error between the output DC voltage Vo and a target value (a predetermined voltage). The potential of the first control signal Ve decreases when the output DC voltage Vo is higher than the target value, and increases when the output DC voltage Vo is lower than the target value. The offset circuit 32 subtracts an offset voltage Es from the first control signal Ve, thereby producing a second control signal Vy(=Ve−Es). The oscillator circuit 33 generates a triangular wave signal Vt that increases and decreases in a certain cycle, for example, at 500 kHz to 1 MHz. The amplitude of the triangular wave signal Vt is Et, and the amplitude (the potential difference) Et is set equal to or smaller than the offset voltage Es (Et≦Es). The first comparator 34 compares the triangular wave signal Vt with the first control signal Ve, and when the first control signal Ve is greater, the first comparator 34 produces the first driving signal DR1 that goes to the high (H) level. The second comparator 35, on the other hand, compares the triangular wave signal Vt with the second control signal Vy, and when the second control signal Vy is greater, the second comparator 35 produces the second driving signal DR2 that goes to the high (H) level.

FIG. 13 shows a timing chart (an operation waveform diagram) of the signals in the control circuit 30. As shown in FIG. 13, in the first half of the chart, the first control signal Ve intersects the triangular wave signal Vt intermittently, but the second control signal Vy does not intersect the triangular wave signal Vt. This causes the first driving signal DR1 produced by the first comparator 34 to become a pulsed signal and turn the first switch 2 on and off alternately. At this time, as the first control signal Ve is raised, the pulse width of the first driving signal DR1 increases. On the other hand, in this first half, the second driving signal DR2 produced by the second comparator 35 is at the low (L) level, such that the second switch 5 is in the off state.

In FIG. 12, when the first switch 2 alternates between the on and off operations and the second switch 5 is in the off state, the buck-boost converter operates as a buck converter. When the first switch 2 is in the on state, the differential voltage (Vi−Vo) between the input DC voltage Vi and the output DC voltage Vo is applied to the inductor 4 to cause current to pass from the input DC power supply 1 to the first switch 2, the inductor 4, and the second diode 6 in this order, whereby electric energy is stored in the inductor 4. On the other hand, when the first switch 2 is in the off state, the output DC voltage Vo is applied to the inductor 4 to cause current to pass through the first diode 3, the inductor 4, and the second diode 6 in this order, whereby the electric energy stored in the inductor 4 is discharged. Where the ratio (the duty ratio) of on-time (the pulse width of the first driving signal DR1) to one switching cycle of the first switch 2 (one cycle of the triangular wave signal Vt) is D1, the output DC voltage Vo is expressed by Vo=D1×Vi. As the first control signal Ve is raised, this duty ratio D1 increases. That is, when the input DC voltage Vi is higher than the output DC voltage Vo, the buck-boost converter operates as a buck converter and the duty ratio D1 is adjusted by the control circuit 30 so that the output DC voltage Vo becomes the target value.

As shown in FIG. 13, in the latter half of the chart, when the first control signal Ve increases and thus does not intersect the triangular wave signal Vt any more, the first driving signal DR1 output from the first comparator 34 is always at the high level, causing the first switch 2 to be kept in the on state. On the other hand, the second control signal Vy comes to intersect the triangular wave signal Vt intermittently, whereby the second driving signal DR2 output from the second comparator 35 becomes a pulsed signal to cause the second switch 5 to alternate between on and off. At this time, as the second control signal Vy is raised, the pulse width of the second driving signal DR2 increases.

In FIG. 12, when the first switch 2 is in the on state and the second switch 5 alternates between the on and off operations, the buck-boost converter operates as a boost converter. When the second switch 5 is in the on state, the input DC voltage Vi is applied to the inductor 4 to cause current to pass from the input DC power supply 1 to the first switch 2, the inductor 4, and the second switch 5 in this order, whereby electric energy is stored in the inductor 4. On the other hand, when the second switch 5 is in the off state, the differential voltage (Vi−Vo) between the input DC voltage Vi and the output DC voltage Vo is applied to the inductor 4 to cause current to pass from the input DC power supply 1 to the first switch 2, the inductor 4, and the second diode 6 in this order, whereby the electric energy stored in the inductor 4 is discharged. Where the ratio (the duty ratio) of on-time (the pulse width of the second driving signal DR2) to one switching cycle of the second switch 5 (one cycle of the triangular wave signal Vt) is D2, the output DC voltage Vo is expressed by Vo=Vi/(1−D2). As the second control signal Vy is raised, this duty ratio D2 increases. That is, when the input DC voltage Vi is lower than the output DC voltage Vo, the buck-boost converter operates as a boost converter and the duty ratio D2 is adjusted by the control circuit 30 so that the output DC voltage Vo becomes the target value.

The reason why the offset voltage Es is set equal to or greater than the amplitude Et of the triangular wave signal Vt is to prevent increase in switching loss caused by a mixture of the on and off operations of the first and second switches 2 and 5 within one switching cycle and to allow the buck-boost converter to operate in such a manner that the operation of the buck converter section 20 and the operation of the boost converter section 25 are separated.

As described above, in the buck-boost converter according to the conventional example, the control circuit 30 adjusts the duty ratio D1 or D2, whereby increase and decrease of the output DC voltage Vo with respect to the input DC voltage Vi can be controlled.

In the buck-boost converter according to the conventional example, it is when the amplitude Et of the triangular wave signal Vt is equal to the offset voltage Es that continuous transitions between the operation of the buck converter section 20 and the operation of the boost converter section 25 are made in accordance with variations in the input DC voltage Vi. However, in actual design, in order to operate the buck-boost converter in such a manner that the operation of the buck converter section 20 and the operation of the boost converter section 25 are separated, the offset voltage Es is set higher than the amplitude Et of the triangular wave signal Vt with consideration given to variation in the circuit constants. In this manner, when the offset voltage Es is set higher than the amplitude Et of the triangular wave signal Vt, neither the first control signal Ve nor the second control signal Vy intersects the triangular wave signal Vt, resulting in the occurrence of a through mode in which the first switch 2 is in the on state and the second switch 5 is in the off state. In the through mode, current passes across the input and output terminals of the buck-boost converter through the first switch 2, the inductor 4, and the second diode 6. In the real world, the operation of the buck-boost converter is not stable in the through mode, and slight variation in input/output conditions and environment causes switching between the through mode and the boost or buck operation. Such transient changes in the operation state are also affected by response speed of the control circuit 30 including the error amplifier circuit 31 and the like and are thus irregular, thereby causing a problem in that the output ripple of the output DC voltage Vo is increased.

SUMMARY OF THE INVENTION

It is therefore an object of the present invention to overcome the problem with the conventional example and to provide a buck-boost converter in which on and off operations are not performed within one switching cycle to thereby separate buck converter operation and boost converter operation, while transitions between the buck converter operation and the boost converter operation are made smoothly to thereby prevent increase in output ripple during the transition periods.

In order to achieve the above object, a buck-boost converter according to the present invention has a configuration in which a compensatory signal generated by dividing the frequency of a triangular wave signal output from an oscillator circuit is added to an error signal that is the difference between an output DC voltage and a predetermined voltage value (target value), so as to generate a driving signal for a switching device.

More specifically, an inventive buck-boost converter includes: a buck converter section including a first switch, first rectifier means, and an inductor; a boost converter section sharing the inductor and including a second switch, second rectifier means, and smoothing means; and a control circuit for generating and outputting a first driving signal for opening and closing the first switch and a second driving signal for opening and closing the second switch, wherein the control circuit includes: an error amplifier circuit for amplifying an error between an output value from the smoothing means and a predetermined voltage value to thereby generate and output an error signal; an oscillator circuit for generating and outputting a triangular wave signal having a predetermined cycle; a compensatory signal generation circuit for generating and outputting a compensatory signal, which oscillates in a cycle that is at least twice the cycle of the triangular wave signal; a control signal generation circuit for adding together the error signal and the compensatory signal to thereby generate and output a control signal; and a comparator circuit for comparing the triangular wave signal with the control signal to generate and output the first or second driving signal.

In the inventive buck-boost converter, the control signal generation circuit preferably includes an adder circuit for adding together the error signal and the compensatory signal to thereby generate a first control signal, and a level shift circuit for subtracting from the first control signal an offset equal to or greater than an amplitude of the triangular wave signal to thereby generate a second control signal; the comparator circuit preferably includes a first comparator circuit for comparing the triangular wave signal with the first control signal to generate the first driving signal, and a second comparator circuit for comparing the triangular wave signal with the second control signal to thereby generate the second driving signal; and an amplitude of the compensatory signal is preferably greater than a difference between the offset and the amplitude of the triangular wave signal.

In this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a frequency dividing circuit, a delay circuit, and an amplifier circuit and generates the compensatory signal by dividing a frequency of the pulse signal and delaying and amplifying a signal obtained by the frequency division.

Also, in this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a frequency dividing circuit, a delay circuit, an amplifier circuit, and a first integrator circuit and generates the compensatory signal, which is a triangular-wave signal, by dividing a frequency of the pulse signal, delaying and amplifying a signal obtained by the frequency division, and passing the delayed and amplified signal through the first integrator circuit.

Also, in this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a frequency dividing circuit, a delay circuit, an amplifier circuit, a first integrator circuit, and a second integrator circuit and generates the compensatory signal, which is a sine-wave signal, by dividing a frequency of the pulse signal, delaying and amplifying a signal obtained by the frequency division, and passing the delayed and amplified signal through the first and second integrator circuits.

In the inventive buck-boost converter, the error amplifier circuit preferably includes: an error amplifier for amplifying the error between the output value from the smoothing means and the predetermined voltage value to thereby generate a first error signal, and a level shift circuit for subtracting from the first error signal an offset equal to or greater than an amplitude of the triangular wave signal to thereby generate a second error signal; the compensatory signal generation circuit preferably includes a first compensatory signal generation circuit for generating a first compensatory signal, which has an amplitude greater than a difference between the offset and the amplitude of the triangular wave signal and oscillates in a cycle that is at least twice the cycle of the triangular wave signal, and a delay circuit for generating a second compensatory signal which is out of phase with the first compensatory signal; the control signal generation circuit preferably includes a first adder circuit for superimposing the first compensatory signal on the first error signal to thereby generate a first control signal, and a second adder circuit for superimposing the second compensatory signal on the second error signal to thereby generate a second control signal; and the comparator circuit preferably includes a first comparator circuit for comparing the triangular wave signal with the first control signal to generate the first driving signal, and a second comparator circuit for comparing the triangular wave signal with the second control signal to output the second driving signal.

In this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a first compensatory signal generation circuit, which includes a frequency dividing circuit and an amplifier circuit and generates the first compensatory signal by dividing a frequency of the pulse signal and amplifying a signal obtained by the frequency division, and a second compensatory signal generation circuit, which generates the second compensatory signal that is out of phase with the first compensatory signal by one-half of the cycle of the triangular wave signal.

Also, in this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a first compensatory signal generation circuit, which includes a frequency dividing circuit, an amplifier circuit, and a first integrator circuit and generates the first compensatory signal by dividing a frequency of the pulse signal, amplifying a signal obtained by the frequency division, and passing the amplified signal through the first integrator circuit, and a second compensatory signal generation circuit, which generates the second compensatory signal that is out of phase with the first compensatory signal by one-half of the cycle of the triangular wave signal, the first compensatory signal being a triangular-wave signal.

Also, in this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a first compensatory signal generation circuit, which includes a frequency dividing circuit, an amplifier circuit, a first integrator circuit, and a second integrator circuit and generates the first compensatory signal by dividing a frequency of the pulse signal, amplifying a signal obtained by the frequency division, and passing the amplified signal through the first and second integrator circuits, and a second compensatory signal generation circuit, which generates the second compensatory signal that is out of phase with the first compensatory signal by one-half of the cycle of the triangular wave signal, the first compensatory signal being a sine-wave signal.

In the inventive buck-boost converter, the oscillator circuit preferably includes a triangular-wave signal generation circuit for generating a first triangular wave signal having the predetermined cycle, and an inverting circuit for generating a second triangular wave signal which is the inverse of the first triangular wave signal and does not intersect the first triangular wave signal; the comparator circuit preferably includes a first comparator circuit for comparing the first triangular wave signal with the control signal to generate the first driving signal, and a second comparator circuit for comparing the second triangular wave signal with the control signal to output the second driving signal; and an amplitude of the compensatory signal is preferably greater than a gap between an oscillation range in which the first triangular wave signal oscillates and an oscillation range in which the second triangular wave signal oscillates.

In this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a frequency dividing circuit and an amplifier circuit and generates the compensatory signal by dividing a frequency of the pulse signal and amplifying a signal obtained by the frequency division.

Also, in this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a frequency dividing circuit and a first integrator circuit and generates the compensatory signal, which is a triangular-wave signal, by dividing a frequency of the pulse signal and passing a signal obtained by the frequency division through the first integrator circuit.

Also, in this case, the oscillator circuit preferably includes a pulse signal generation circuit for generating a pulse signal whose first level corresponds to rise of the triangular wave signal and whose second level corresponds to fall of the triangular wave signal; and the compensatory signal generation circuit preferably includes a frequency dividing circuit, a first integrator circuit, and a second integrator circuit and generates the compensatory signal, which is a sine-wave signal, by dividing a frequency of the pulse signal and passing a signal obtained by the frequency division through the first and second integrator circuits.

As described above, in the inventive buck-boost converter, the control signal obtained by adding together the error signal and the compensatory signal is compared with the triangular wave signal produced by the oscillator circuit. Therefore, in the transition periods between the boost converter operation and the buck converter operation, switching between the boost converter operation and the buck converter operation is made in accordance with the cycles of the compensatory signal. This avoids irregular switching between the through mode and the boost or buck operation, while preventing the first and second switches from performing the on and off operations within one switching cycle. As a result, it is possible to separate the operation of the buck converter section and the operation of the boost converter section, thereby enabling smooth transitions between the boost operation and the buck operation.

DETAILED DESCRIPTION OF THE INVENTION

FIRST EMBODIMENT

A buck-boost converter according to a first embodiment of the present invention will be described with reference to the accompanying drawings.

Figure 1:
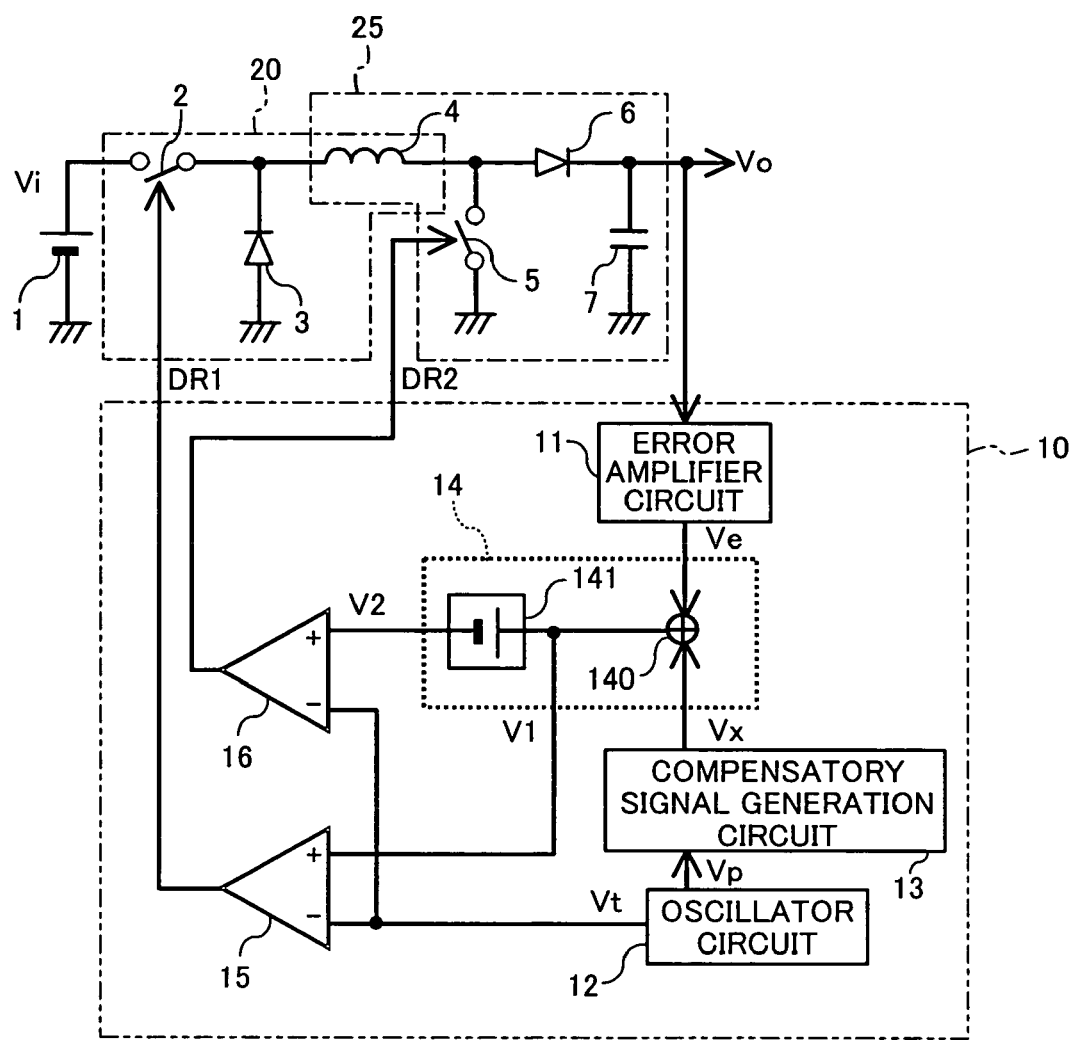
FIG. 1 is a circuit diagram illustrating a buck-boost converter according to a first embodiment of the present invention.

FIG. 1 shows the circuit configuration of the buck-boost converter according to the first embodiment of the present invention. As shown in FIG. 1, the buck-boost converter of the first embodiment includes: a buck converter section 20, which includes a first switch 2, a first diode 3 serving as first rectifier means, and an inductor 4; a boost converter section 25, which shares the inductor 4 and includes a second switch 5, a second diode 6 serving as second rectifier means, and a capacitor 7 serving as smoothing means; and a control circuit 10, which generates and outputs a first driving signal DR1 for opening and closing the first switch 2 and a second driving signal DR2 for opening and closing the second switch 5. As the first switch 2 and the second switch 5, MOS transistors may be used, for example.

In the buck converter section 20, the input terminal of the first switch 2 is connected to an input DC power supply 1, such as a DC battery, which provides a voltage Vi, while the output terminal of the first switch 2 is connected in series with the cathode of the first diode 3, and this series circuit is connected in parallel with the input DC power supply 1. One terminal of the inductor 4 is connected to the junction of the first switch 2 and the first diode 3. The control terminal (gate) of the first switch 2 receives the first driving signal DR1, while the anode of the first diode 3 is grounded.

In the boost converter section 25, the second switch 5 is connected in series with the anode of the second diode 6, and this series circuit is connected in parallel with one terminal of the capacitor 7. The other terminal of the inductor 4, which is shared with the buck converter section 20, is connected to the junction of the second switch 5 and the second diode 6. From the junction of the second diode 6 and the capacitor 7, an output DC voltage Vo is output to supply power to various kinds of electronic circuits (not shown). The control terminal (gate) of the second switch 5 receives the second driving 5 signal DR2, while the terminal of the second switch 5 away from the junction with the second diode 6 is grounded. The other terminal of the capacitor 7 is grounded.

The control circuit 10 detects the output DC voltage Vo output from the one terminal of the capacitor 7 and outputs the first driving signal DR1 and the second driving signal DR2 to the buck converter section 20 and the boost converter section 25, respectively, thereby controlling the buck converter section 20 and the boost converter section 25.

More specifically, the control circuit 10 includes an error amplifier circuit 11, an oscillator circuit 12, a compensatory signal generation circuit 13, a control signal generation circuit 14, a first comparator 15, and a second comparator 16. The error amplifier circuit 11 generates an error signal Ve by amplifying an error between the output DC voltage Vo and a target value (a predetermined voltage) and outputs the error signal Ve. The oscillator circuit 12 generates and outputs a triangular wave signal Vt and a pulse signal Vp corresponding to increase and decrease in the voltage of the triangular wave signal Vt. The compensatory signal generation circuit 13 generates a compensatory signal Vx by delaying the pulse signal Vp, dividing the frequency of the delayed signal, and amplifying the resultant signal having the divided frequency, and outputs the compensatory signal Vx. The control signal generation circuit 14 includes an adder circuit 140 and an offset circuit 141. The first comparator 15 compares the triangular wave signal Vt with a first control signal V1 and outputs the comparison result as the first driving signal DR1. The second comparator 16 compares the triangular wave signal Vt with a second control signal V2 and outputs the comparison result as the second driving signal DR2.

The compensatory signal generation circuit 13 doubles the cycle of the pulse signal Vp output from the oscillator circuit 12, performs a phase shift so that the rising and falling portions of the compensatory signal Vx (which is a square wave) where steep level changes occur do not intersect the end (top) portions of the triangular wave signal Vt, and sets the amplitude of the compensatory signal Vx to an appropriate value.

The adder circuit 140 of the control signal generation circuit 14 generates the first control signal V1 by adding the compensatory signal Vx to the error signal Ve and outputs the first control signal V1, while the offset circuit 141 generates, from the first control signal V1, an offset voltage Vos having a voltage difference slightly greater than the amplitude Et of the triangular wave signal Vt and outputs the offset voltage Vos. More specifically, the adder circuit 140 and the offset circuit 141 generate the first control signal V1 and the second control signal V2, which is obtained by subtracting the offset voltage Vos from the first control signal V1. The amplitude Ex of the compensatory signal Vx is set greater (Ex>Vos−Et) than the differential voltage (Vos−Et) between the offset voltage Vos and the amplitude Et of the triangular wave signal Vt.

The first comparator 15 makes a comparison between the triangular wave signal Vt and the first control signal V1 and outputs the first driving signal DR1 that turns on the first switch 2 when the voltage of the first control signal V1 is higher than that of the triangular wave signal Vt, and turns off the first switch 2 when the voltage of the first control signal V1 is lower than that of the triangular wave signal Vt.

The second comparator 16 makes a comparison between the triangular wave signal Vt and the second control signal V2 and outputs the second driving signal DR2 that turns on the second switch 5 when the voltage of the second control signal V2 is higher than that of the triangular wave signal Vt, and turns off the second switch 5 when the voltage of the second control signal V2 is lower than that of the triangular wave signal Vt.

Figure 2:
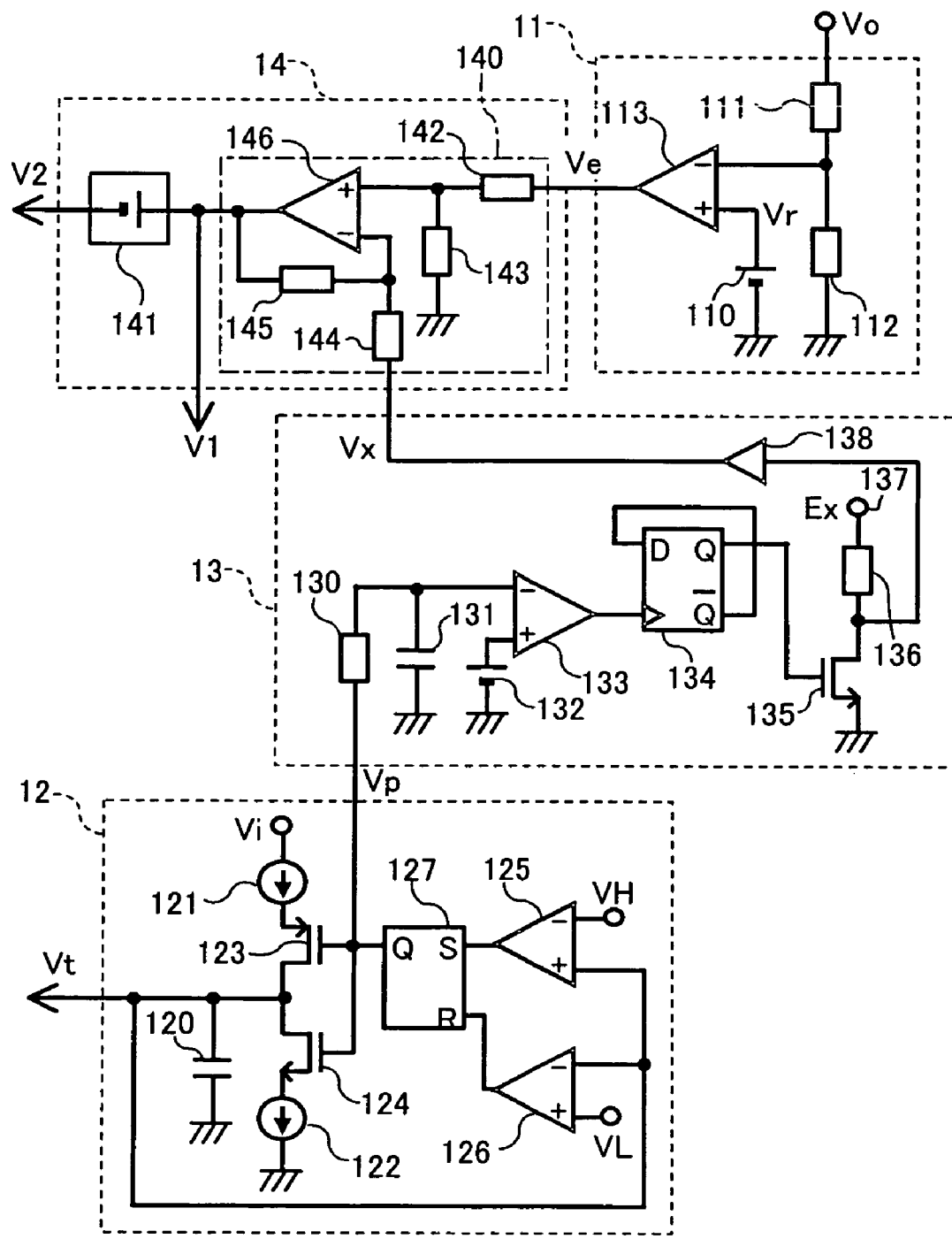
FIG. 2 is a circuit diagram illustrating examples of circuits in a control circuit in the buck-boost converter according to the first embodiment of the present invention.

FIG. 2 illustrates examples of the circuit configurations of the error amplifier circuit 11, the oscillator circuit 12, the compensatory signal generation circuit 13, and the control signal generation circuit 14 in the control circuit 10 according to the first embodiment. As shown in FIG. 2, the error amplifier circuit 11 includes a reference voltage source 110, a first resistor 111 and a second resistor 112 for dividing the output DC voltage Vo, and an operational amplifier 113 for making a comparison between the divided voltage and the reference voltage Vr of the reference voltage source 110 and amplifying the comparison result. The error signal Ve is output from the operational amplifier 113.

The oscillator circuit 12 includes: a capacitor 120 for outputting the triangular wave signal Vt; a first constant current source 121 for charging the capacitor 120; a second constant current source 122 for discharging the capacitor 120; a PMOS transistor 123 and an NMOS transistor 124 for switching between the charging and discharging of the capacitor 120; a high level comparator 125 for comparing the triangular wave signal Vt and a high potential VH; a low level comparator 126 for comparing the triangular wave signal Vt and a low potential VL; and an RS latch 127, which is set by an output value from the high level comparator 125 and reset by an output value from the low level comparator 126.

An output value from the RS latch 127 is connected to the gates of the PMOS transistor 123 and NMOS transistor 124 and is thus set so that equal current passes through the first and second constant current sources 121 and 122. The output value from the RS latch 127 is also output as the pulse signal Vp to the compensatory signal generation circuit 13. In the oscillator circuit 12, this configuration allows the capacitor 120 to be charged and discharged between the high potential VH and the low potential VL by the charge current and the discharge current that are equal to each other, whereby the triangular wave signal Vt in which the rise and fall times are equal to each other, and the pulse signal Vp that is synchronized with the triangular wave signal Vt are generated.

The compensatory signal generation circuit 13 includes: a capacitor 131 to which the pulse signal Vp input from the oscillator circuit 12 is applied through a first resistor 130; a comparator 133 for comparing the voltage of the capacitor 131 and the voltage of a first voltage source 132; a frequency dividing circuit 134, which is a D latch, for doubling the cycle of the output signal of the comparator 133; an NMOS transistor 135 which is driven by the output signal of the frequency dividing circuit 134 and whose source is grounded; a second resistor 136 connected between the drain of the NMOS transistor 135 and a second voltage source 137 for outputting a voltage Ex that determines the pulse voltage of the compensatory signal Vx; and a buffer circuit 138 to which the potential at the junction of the drain of the NMOS transistor 135 and the second resistor 136 is input. The output value of the buffer circuit 138 is the compensatory signal Vx. By this configuration, the output signal of the comparator 133 becomes a pulse signal delayed from the pulse signal Vp by the time constants of the first resistor 130 and capacitor 131, the frequency of the delayed pulse signal is divided, and thereafter the resultant signal having the divided frequency is converted into the compensatory signal Vx having an amplitude equal to the voltage Ex of the second voltage source 137, and then the compensatory signal Vx is output.

The adder circuit 140 of the control signal generation circuit 14 includes a first series circuit, a second series circuit, and an operational amplifier 146. The first series circuit includes a first resistor 142, to which the error signal Ve output from the error amplifier circuit 11 is applied, and a second resistor 143. The second series circuit includes a third resistor 144, to which the compensatory signal Vx output from the compensatory signal generation circuit 13 is applied, and a fourth resistor 145.

The potential at the junction of the first and second resistors 142 and 143 is applied to the noninverting input terminal of the operational amplifier 146, while the terminal of the second resistor 143 away from the junction is grounded. The potential at the junction of the third and fourth resistors 144 and 145 is applied to the inverting input terminal of the operational amplifier 146, while the terminal of the fourth resistor 145 away from the junction is connected with the output terminal of the operational amplifier 146. The output value of the operational amplifier 146 is the first control signal V1. The resistance values of the first and second resistors 142 and 143 are set equal to each other, and the resistance values of the third and fourth resistors 144 and 145 are also set equal to each other. By this configuration, a voltage of Ve/2 is applied to the noninverting input terminal of the operational amplifier 146, while a voltage of (Vx+V1)/2 is applied to the inverting input terminal thereof. Since the operational amplifier 146 adjusts the first control signal V1 so that the potential Ve/2 and the potential (Vx+V1)/2 are equal to each other, V1=Ve−Vx. That is, the first control signal V1 is a signal obtained by subtracting the compensatory signal Vx from the error signal Ve. To obtain the first control signal V1, the compensatory signal Vx may be superimposed on the error signal Ve, and thus may be added to or subtracted from the error signal Ve.

Figure 3:
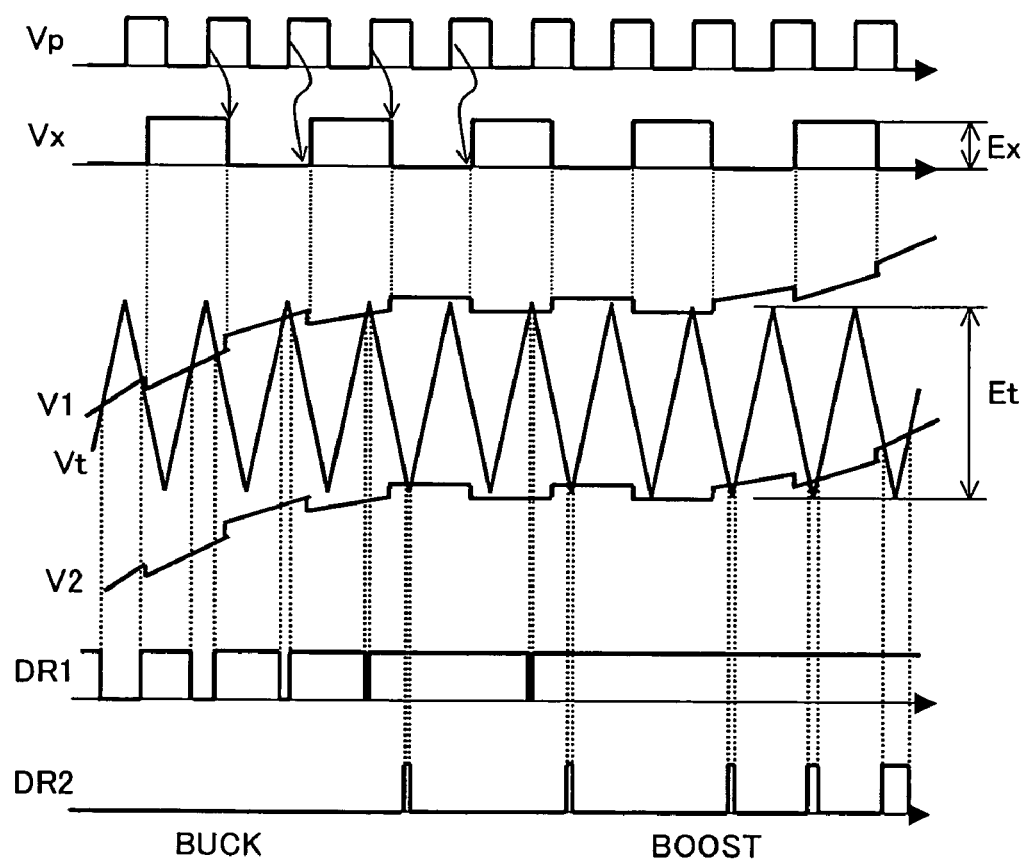
FIG. 3 is a timing chart of the control circuit in the buck-boost converter according to the first embodiment of the present invention.

FIG. 3 shows a timing chart (an operation waveform chart) for the respective signals (the pulse signal Vp, the compensatory signal Vx, the triangular wave signal Vt, the first control signal V1, the second control signal V2, the first driving signal DR1, and the second driving signal DR2) in the control circuit 10 according to the first embodiment. As shown in FIG. 3, in the triangular wave signal Vt, the rise and fall times are equal to each other, and in the pulse signal Vp, the time interval in which the pulse signal Vp is at the high "H" level and the time interval in which the pulse signal Vp is at the low "L" level are equal to each other. As described previously, the amplitude Ex of the compensatory signal Vx is set greater than the differential voltage (Vos−Et) between the offset voltage Vos and the amplitude Et of the triangular wave signal Vt.

In the first half of the chart shown in FIG. 3, the first control signal V1 intermittently intersects the triangular wave signal Vt, but the second control signal V2 does not intersect the triangular wave signal Vt. Therefore, the first driving signal DR1 output from the first comparator 15 controls the first switch 2 in such a manner that the first switch 2 alternates between the on and off operations. On the other hand, since the second driving signal DR2 output from the second comparator 16 remains at the low level, the second switch 5 is in the off state.

When the first switch 2 alternates between the on and off operations and the second switch 5 is in the off state, the buck-boost converter according to the first embodiment operates as a buck converter.

When the first switch 2 is in the on state, the differential voltage (Vi−Vo) between the input DC voltage Vi and the output DC voltage Vo is applied to the inductor 4 to cause current to pass from the input DC power supply 1 to the first switch 2, the inductor 4, and the second diode 6 in this order, whereby electric energy is stored in the inductor 4. On the other hand, when the first switch 2 is in the off state, the output DC voltage Vo is applied to the inductor 4 to cause current to pass through the first diode 3, the inductor 4, and the second diode 6 in this order, whereby the electric energy stored in the inductor 4 is discharged. Where the ratio (the duty ratio) of on-time (the pulse width of the first driving signal DR1) to one switching cycle of the first switch 2 (one cycle of the triangular wave signal Vt) is D1, the output DC voltage Vo is expressed by Vo=D1×Vi. As the first control signal V1 is raised, this duty ratio D1 increases. That is, when the input DC voltage Vi is higher than the output DC voltage Vo, the buck-boost converter according to the first embodiment operates as a buck converter, and the duty ratio D1 is adjusted by the control circuit 10 so that the output DC voltage Vo becomes the target value.

In FIG. 3, when the second control signal V2 comes to intersect the triangular wave signal Vt (in the middle portion of the chart shown in FIG. 3), the second control signal V2 intersects the triangular wave signal Vt once every two switching cycles of the pulse signal Vp, because the compensatory signal Vx whose cycle is twice as long as one switching cycle of the pulse signal Vp is superimposed on the second control signal V2. On the other hand, the first control signal V1 is greater than the second control signal V2 only by the offset voltage Vos, which is slightly greater than the amplitude Et of the triangular wave signal Vt, and the compensatory signal Vx whose amplitude is greater than Vos−Et is superimposed on the first control signal V1. Therefore, the first control signal V1, like the second control signal V2, intersects the triangular wave signal Vt once every two switching cycles.

The reason why the compensatory signal Vx is delayed with respect to the pulse signal Vp by about one-quarter of a cycle is to prevent the end (top) portions of the triangular wave signal Vt and the varying portions (rising and falling portions) of the first and second control signals V1 and V2 from overlapping each other, which would otherwise cause the pulse width of each of the first and second control signals V1 and V2 to become unstable. At this time, the cycle, in which the second switch 5 is in the off state and the first switch 2 alternates between the on and off operations, thereby causing the buck-boost converter to operate as a buck converter, and the cycle, in which the first switch 2 is in the on state and the second switch 5 alternates between the on and off operations, thereby causing the buck-boost converter to operate as a boost converter, occur alternately.

Next, in the latter half of the chart shown in FIG. 3, when the first control signal V1 does not intersect the triangular wave signal Vt any more, the first driving signal DR1 is always at the high level, causing the first switch 2 to be in the on state continuously. On the other hand, the second control signal V2 comes to intersect the triangular wave signal Vt intermittently, whereby the second driving signal DR2 causes the second switch 5 to alternate between the on and off operations. As the second control signal V2 is raised, the pulse width of the second driving signal DR2 increases. When the first switch 2 is in the on state and the second switch 5 performs the on and off operations in this manner, the buck-boost converter operates as a boost converter. When the second switch 5 is in the on state, the input DC voltage Vi is applied to the inductor 4 to cause current to pass from the input DC power supply 1 to the first switch 2, the inductor 4, and the second switch 5 in this order, whereby electric energy is stored in the inductor 4. On the other hand, when the second switch 5 is in the off state, the differential voltage (Vi−Vo) between the input DC voltage Vi and the output DC voltage Vo is applied to the inductor 4 to cause current to pass from input DC power supply 1 to the first switch 2, the inductor 4, and the second diode 6 in this order, whereby the electric energy stored in the inductor 4 is discharged. Where the ratio (the duty ratio) of on-time (the pulse width of the second driving signal DR2) to one switching cycle of the second switch 5 (one cycle of the triangular wave signal Vt) is D2, the output DC voltage Vo is expressed by Vo=Vi/(1−D2). As the second control signal V2 is raised, this duty ratio D2 increases. That is, when the input DC voltage Vi is lower than the output DC voltage Vo, the buck-boost converter operates as a boost converter and the duty ratio D2 is adjusted by the control circuit 10 so that the output DC voltage Vo becomes the target value.

As described above, in the buck-boost converter according to the first embodiment, increase and decrease of the output DC voltage Vo with respect to the input DC voltage Vi can be controlled by adjusting the duty ratio D1 or D2. Also, in the transition regions between the buck converter operation and the boost converter operation, the cycle for the buck converter operation and the cycle for the boost converter operation occur alternately. Therefore, the first switch 2 and the second switch 5 do not perform the on and off operations within one switching cycle, thereby preventing increase in switching loss. In this way, the buck converter section 20 and the boost converter section 25 can be operated separately, while smooth transitions between the boost operation and the buck operation can be made.

SECOND EMBODIMENT

Hereinafter, a buck-boost converter according to a second embodiment of the present invention will be described with reference to the accompanying drawings.

Figure 4:
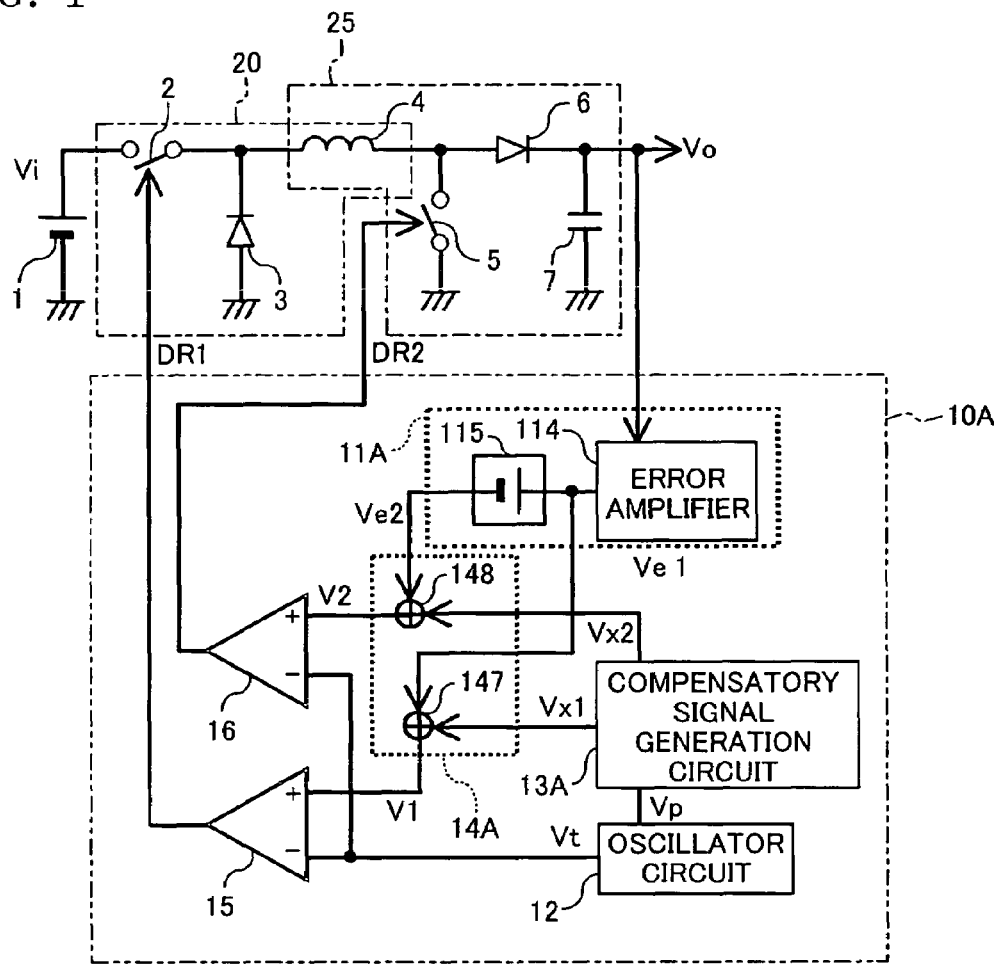
FIG. 4 is a circuit diagram illustrating a buck-boost converter according to a second embodiment of the present invention.

FIG. 4 shows the circuit configuration of the buck-boost converter according to the second embodiment of the present invention. In FIG. 4, the same members as those of the buck-boost converter shown in FIG. 1 are identified by the same reference numerals and the description thereof will be thus omitted herein.

The buck-boost converter according to the second embodiment includes a control circuit 10A which is different in configuration from the control circuit 10 of the first embodiment.

As shown in FIG. 4, the control circuit 10A of the second embodiment includes: an error amplifier circuit 11A composed of an error amplifier 114 and an offset voltage source 115; a compensatory signal generation circuit 13A; and a control signal generation circuit 14A.

The error amplifier 114 of the error amplifier circuit 11A generates a first error signal Ve1 by amplifying an error voltage between an output DC voltage Vo and a target voltage and outputs the first error signal Ve1. For the circuit configuration of the error amplifier 114, the error amplifier circuit 11 shown in FIG. 2, for example, may be used.

The offset voltage source 115 of the error amplifier circuit 11A receives the first error signal Ve1 from the error amplifier 114 and generates a second error signal Ve2 by subtracting an offset voltage Vos from the received first error signal Ve1 and outputs the second error signal Ve2. For the offset voltage source 115, the offset circuit 141 shown in FIG. 1, for example, may be used.

The compensatory signal generation circuit 13A generates a first compensatory signal Vx1 by dividing the frequency of a pulse signal Vp output from an oscillator circuit 12 and then amplifying the obtained signal having the divided frequency, and outputs the first compensatory signal Vx1, while the compensatory signal generation circuit 13A generates and outputs a second compensatory signal Vx2 whose phase is shifted from the first compensatory signal Vx1 by a half cycle of the pulse signal Vp. That is, the compensatory signal generation circuit 13A doubles the cycle of the pulse signal Vp, sets the amplitude of each of the compensatory signals Vx1 and Vx2 appropriately, and generates the second compensatory signal Vx2 that is shifted by a half cycle of the pulse signal Vp from the first compensatory signal Vx1.

The control signal generation circuit 14A includes a first adder circuit 147 for adding the first compensatory signal Vx1 to the first error signal Ve1 to thereby generate and output the first control signal V1, and a second adder circuit 148 for adding the second compensatory signal Vx2 to the second error signal Ve2 to thereby generate and output the second control signal V2.

As in the first embodiment, the offset voltage Vos is set slightly greater than the amplitude Et of the triangular wave signal Vt, and the amplitude Ex of each of the first and second compensatory signals Vx1 and Vx2 is set greater than the differential voltage (Vos−Et) between the offset voltage Vos and the amplitude Et of the triangular wave signal Vt (Ex>Vos−Et).

Figure 5:
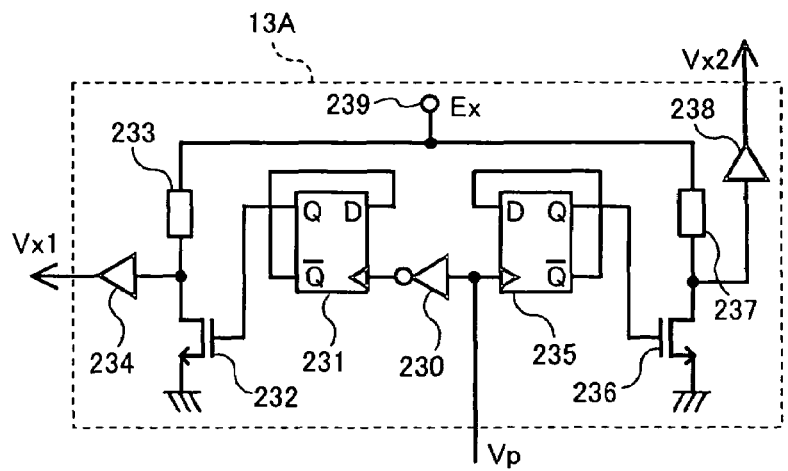
FIG. 5 is a circuit diagram illustrating a compensatory signal generation circuit in a control circuit in the buck-boost converter according to the second embodiment of the present invention.

FIG. 5 shows an exemplary circuit configuration for the compensatory signal generation circuit 13A. As shown in FIG. 5, the compensatory signal generation circuit 13A according to the second embodiment includes: an inverter 230 which receives the pulse signal Vp output from the oscillator circuit 12; a first frequency dividing circuit 231 which is a D latch and receives at its clock terminal the output signal of the inverter 230; a first NMOS transistor 232 whose source is grounded and which is driven by the output signal of the first frequency dividing circuit 231; a first resistor 233 connected between the drain of the first NMOS transistor 232 and a voltage source 239 which provides a voltage Ex; and a first buffer 234 to which the potential at the junction of the drain of the first NMOS transistor 232 and the first resistor 233 is input.

The compensatory signal generation circuit 13A also includes: a second frequency dividing circuit 235 which is a D latch and receives at its clock terminal the pulse signal Vp; a second NMOS transistor 236 whose source is grounded and which is driven by the output signal of the second frequency dividing circuit 235; a second resistor 237 connected between the drain of the second NMOS transistor 236 and the voltage source 239; and a second buffer 238 to which the potential at the junction of the drain of the second NMOS transistor 236 and the second resistor 237 is input. Therefore, the output signal of the first buffer 234 is the first compensatory signal Vx1, and the output signal of the second buffer 238 is the second compensatory signal Vx2.

By this configuration, the compensatory signal generation circuit 13A generates the two frequency-divided signals Vx1 and Vx2 that are out of phase with each other by a half cycle of the pulse signal Vp output from the oscillator circuit 12, sets the amplitude of each of these frequency-divided signals Vx1 and Vx2 to the voltage Ex, and outputs, to the control signal generation circuit 14A, the frequency-divided signals Vx1 and Vx2 as the first and second compensatory signals Vx1 and Vx2.

Now, with reference to FIGS. 4, 5 and 6, it will be described how the control circuit 10A in the buck-boost converter according to the second embodiment operates.

Figure 6:
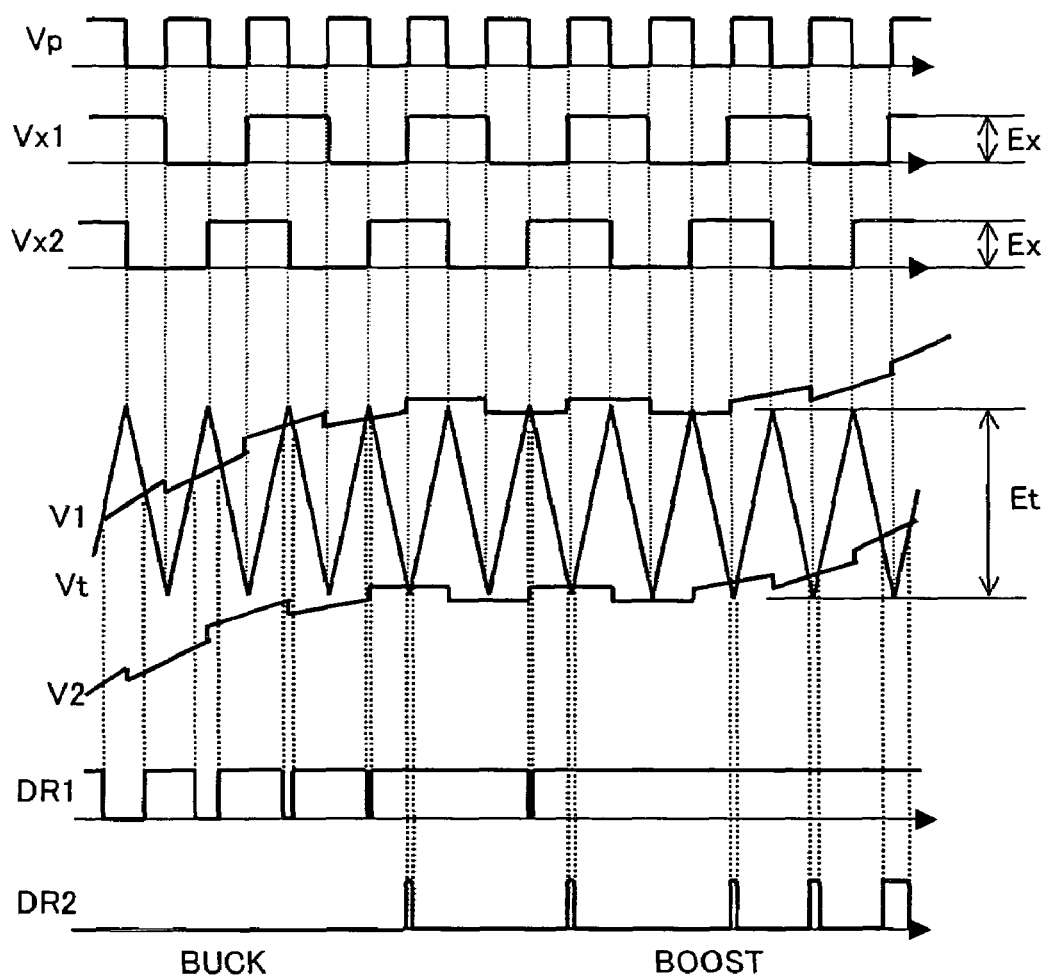
FIG. 6 is a timing chart of the control circuit in the buck-boost converter according to the second embodiment of the present invention.

FIG. 6 shows a timing chart (an operation waveform diagram) of the control circuit 10A according to the second embodiment and indicates the signal waveforms of the pulse signal Vp, the first compensatory signal Vx1, the second compensatory signal Vx2, the triangular wave signal Vt, the first control signal V1, the second control signal V2, the first driving signal DR1, and the second driving signal DR2. As shown in FIG. 6, the rise and fall times in the triangular wave signal Vt are equal to each other, and in the pulse signal Vp, the time interval in which the pulse signal Vp is at the high "H" level and the time interval in which the pulse signal Vp is at the low "L" level are also equal to each other. As mentioned previously, the first compensatory signal Vx1 has the frequency obtained by dividing the frequency of the pulse signal Vp by two by the first frequency dividing circuit 231, and the amplitude Ex thereof is set greater than the differential voltage (Vos−Et) between the offset voltage Vos and the amplitude Et of the triangular wave signal Vt (Ex>Vos−Et) by the amplifier circuit. A delay circuit delays the phase of the second compensatory signal Vx2 from the first compensatory signal Vx1 by a half cycle of the pulse signal Vp.

In the first half of the chart shown in FIG. 6, the first control signal V1 intermittently intersects the triangular wave signal Vt, but the second control signal V2 does not intersect the triangular wave signal Vt. This causes the first driving signal DR1 to control the first switch 2 in such a manner that the first switch 2 alternates between the on and off operations. On the other hand, since the second driving signal DR2 remains at the low level, the second switch 5 is in the off state. That is, the buck-boost converter according to the second embodiment operates as a buck converter.

In the middle portion of the chart shown in FIG. 6, when the second control signal V2 comes to intersect the triangular wave signal Vt, the second control signal V2 intersects the triangular wave signal Vt once every two switching cycles, because the second compensatory signal Vx2 whose cycle is twice as long as one switching cycle is superimposed on the second control signal V2. On the other hand, the first control signal V1 is greater than the second control signal V2 only by the offset voltage Vos, which is slightly greater than the amplitude Et of the triangular wave signal Vt, and the first compensatory signal Vx1 whose amplitude is greater than Vos−Et is superimposed on the first control signal V1. Thus, the first control signal V1 intersects the triangular wave signal Vt once every two switching cycles. The reason why the phase of the second compensatory signal Vx2 is shifted with respect to that of the first compensatory signal Vx1 is to prevent the end portions of the triangular wave signal Vt and the varying portions (rising and falling portions) of the first and second control signals V1 and V2 from overlapping each other, which would otherwise cause the pulse widths to become unstable. At this time, the cycle, in which the second switch 5 is in the off state and the first switch 2 alternates between the on and off operations, thereby causing the buck-boost converter to operate as a buck converter, and the cycle, in which the first switch 2 is in the on state and the second switch 5 alternates between the on and off operations, thereby causing the buck-boost converter to operate as a boost converter, occur alternately.

Furthermore, in the latter half of the chart shown in FIG. 6, when the first control signal V1 does not intersect the triangular wave signal Vt any more, the first driving signal DR1 is always at the high level, thereby causing the first switch 2 to be in the on state. On the other hand, the second driving signal DR2 makes the second switch 5 alternate between the on and off operations. Moreover, as the second control signal V2 is raised, the pulse width of the second driving signal DR2 increases. Therefore, the buck-boost converter according to the second embodiment operates as a boost converter.

As described above, in the buck-boost converter according to the second embodiment, as in the buck-boost converter of the first embodiment, increase and decrease of the output DC voltage Vo with respect to the input DC voltage Vi can be controlled. Also, in the transition regions between the operation of the buck converter section 20 and the operation of the boost converter section 25, the duty cycle for the buck converter section 20 and the duty cycle for the boost converter section 25 occur alternately. Therefore, the first switch 2 and the second switch 5 do not perform the on and off operations within one switching cycle, thereby preventing increase in switching loss. This allows the buck converter section 20 and the boost converter section 25 to operate separately, while enabling smooth transitions between the boost operation and the buck operation.

THIRD EMBODIMENT

Hereinafter, a buck-boost converter according to a third embodiment of the present invention will be described with reference to the accompanying drawings.

Figure 7A:
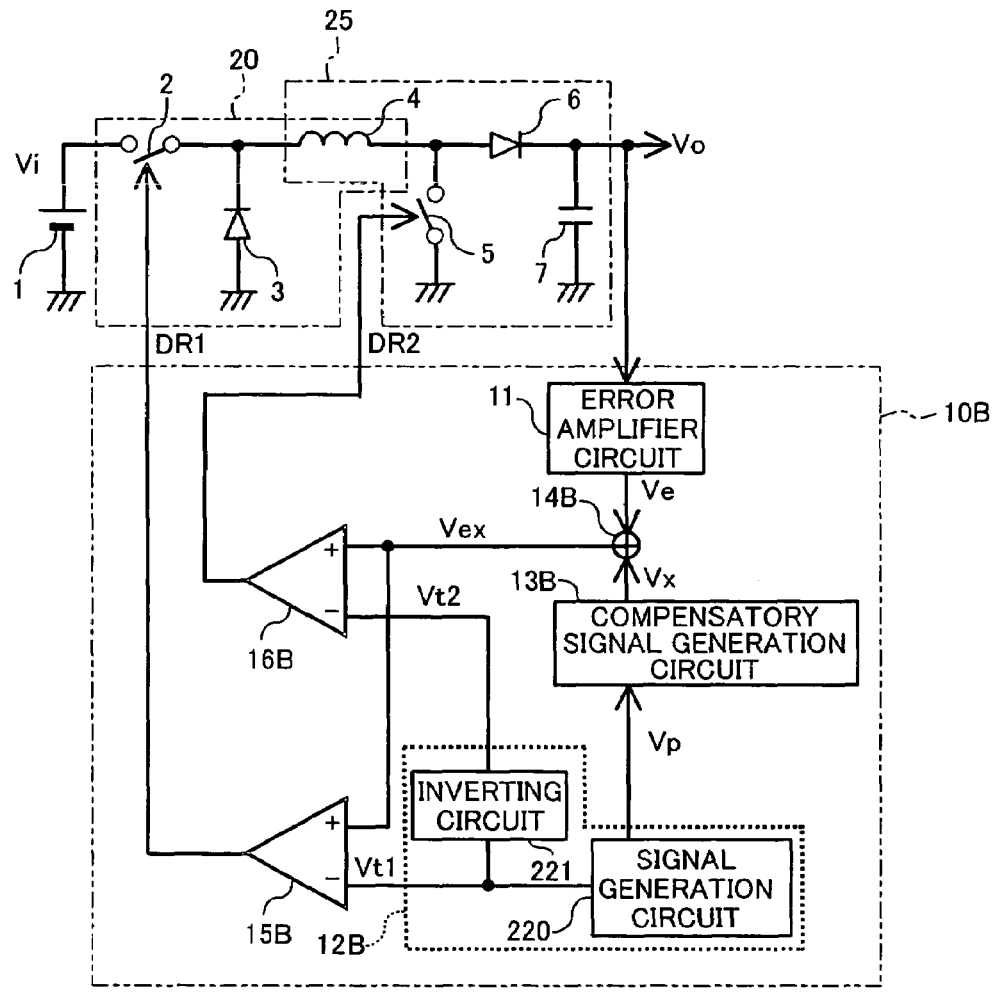
FIG. 7A is a circuit diagram illustrating a buck-boost converter according to a third embodiment of the present invention.

FIG. 7A shows the circuit configuration of the buck-boost converter according to the third embodiment of the present invention. In FIG. 7A, the same members as those of the buck-boost converter shown in FIG. 1 are identified by the same reference numerals and the description thereof will be thus omitted herein.

The buck-boost converter according to the third embodiment includes a control circuit 10B which is different in configuration from the control circuit 10 of the first embodiment.

As shown in FIG. 7A, the control circuit 10B of the third embodiment includes: an oscillator circuit 12B, a compensatory signal generation circuit 13B; a control signal generation circuit 14B; a first comparator 15B; and a second comparator 16B.

The oscillator circuit 12B includes a signal generation circuit 220 and an inverting circuit 221. The signal generation circuit 220 generates a first triangular wave signal Vt1 and a pulse signal Vp that corresponds to increase and decrease in the voltage of the first triangular wave signal Vt1. The inverting circuit 221 generates a second triangular wave signal Vt2 by inverting and level-shifting the first triangular wave signal Vt1 produced from the signal generation circuit 220, and outputs the second triangular wave signal Vt2. The first triangular wave signal Vt1 and the second triangular wave signal Vt2 do not intersect each other, and the peak value of the first triangular wave signal Vt1 and the valley value of the second triangular wave signal Vt2 are set to have a voltage difference therebetween which is a gap voltage Vd.

The compensatory signal generation circuit 13B generates a compensatory signal Vx by dividing the frequency of the pulse signal Vp produced from the signal generation circuit 220 and amplifying the resultant signal having the divided frequency. The circuit configuration of the compensatory signal generation circuit 13B may be that of the compensatory signal generation circuit 13 shown in FIG. 2 without the capacitor 131. Also, the amplitude Ex of the compensatory signal Vx is set greater than the gap voltage Vd (Ex>Vd).

The control signal generation circuit 14B generates a control signal Vex by adding the compensatory signal Vx to an error signal Ve and then outputs the control signal Vex.

The first comparator 15B makes a comparison between the control signal Vex and the first triangular wave signal Vt1. When the control signal Vex is greater than or equal to the first triangular wave signal Vt1, the first comparator 15B outputs a first driving signal DR1 at the high level. When the control signal Vex is smaller than the first triangular wave signal Vt1, the first comparator 15B outputs a first driving signal DR1 at the low level.

The second comparator 16B makes a comparison between the control signal Vex and the second triangular wave signal Vt2. When the control signal Vex is greater than or equal to the second triangular wave signal Vt2, the second comparator 16B outputs a second driving signal DR2 at the high level. When the control signal Vex is smaller than the second triangular wave signal Vt2, the second comparator 16B outputs a second driving signal DR2 at the low level.

Figure 7B:
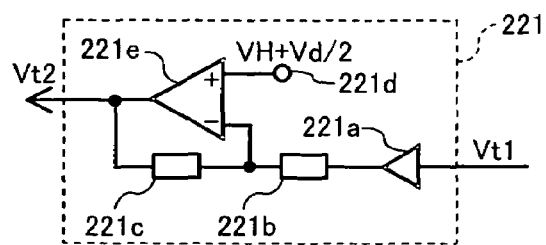
FIG. 7B is a circuit diagram illustrating a compensatory signal generation circuit in a control circuit in the buck-boost converter according to the third embodiment of the present invention.

FIG. 7B shows an exemplary circuit configuration for the inverting circuit 221. The inverting circuit 221 includes, for example, a buffer circuit 221a for receiving the first triangular wave signal Vt1 from the signal generation circuit 220, a series circuit including a first resistor 221b for receiving the output signal of the buffer circuit 221a and a second resistor 221c, and an operational amplifier 221e whose inverting input terminal is connected to the junction of the first resistor 221b and the second resistor 221c, whose noninverting input terminal is connected to a voltage source 221d which provides a voltage of VH+Vd/2, and whose output terminal is connected to the terminal of the second resistor 221c away from the junction. This configuration allows the inverting circuit 221 to output the second triangular wave signal Vt2 that is the inverse of the first triangular wave signal Vt1. When the resistance values of the first and second resistors 221b and 221c are set equal to each other, the second triangular wave signal Vt2 is expressed by the following expression (1).

$$Vt2 = 2VH + Vd - Vt1. \quad (1)$$

Then, when the first triangular wave signal Vt1 has a peak value of VH, the second triangular wave signal Vt2 has a value of VH+Vd, and when the first triangular wave signal Vt1 has a valley value of VL, the second triangular wave signal Vt2 has a value of 2VH+Vd−VL. That is, when the second triangular wave signal Vt2 has its peak value, the first triangular wave signal Vt1 has its valley value, and when the second triangular wave signal Vt2 has its valley value, the first triangular wave signal Vt1 has its peak value. Thus, the peak value of the first triangular wave signal Vt1 and the valley value of the second triangular wave signal Vt2 are set to have a voltage difference therebetween which is the gap voltage Vd.

Figure 12:
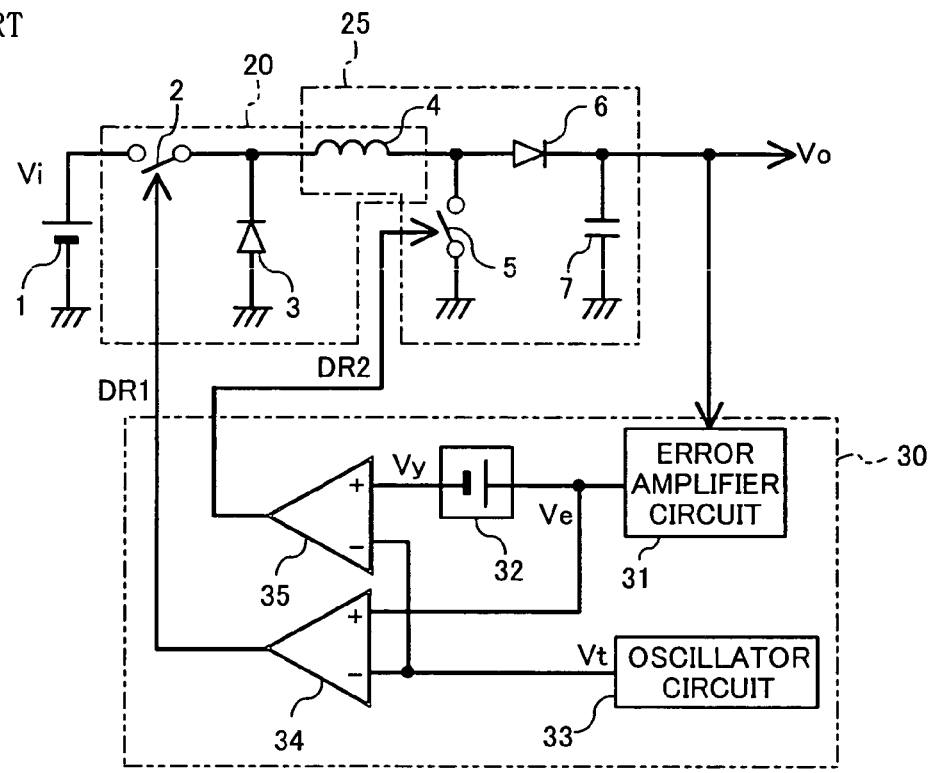
FIG. 12 is a circuit diagram illustrating a conventional buck-boost converter.
Figure 13:
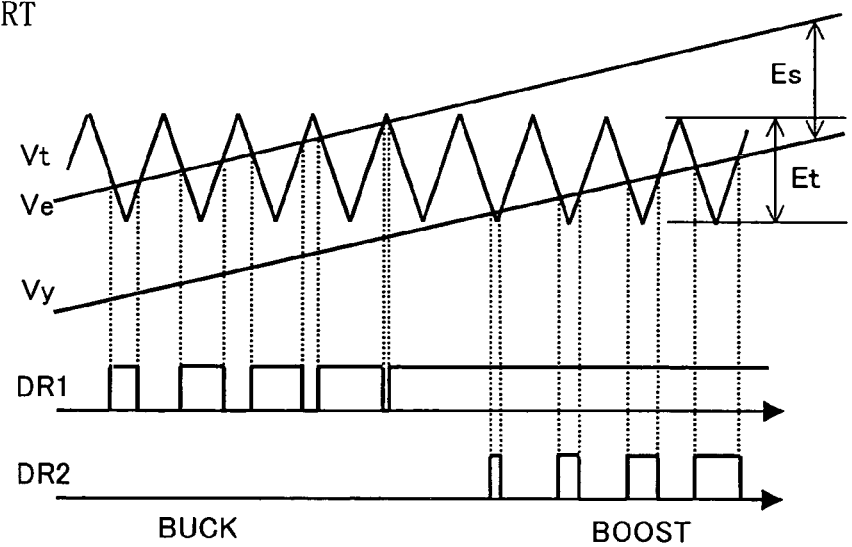
FIG. 13 is a timing chart of a control circuit in the conventional buck-boost converter.

For the circuit configuration of the signal generation circuit 220, the oscillator circuit 12 shown in FIG. 12 may be used.

Now, with reference to FIGS. 7A and 8, it will be described how the control circuit 10B in the buck-boost converter according to the third embodiment operates.

Figure 8:
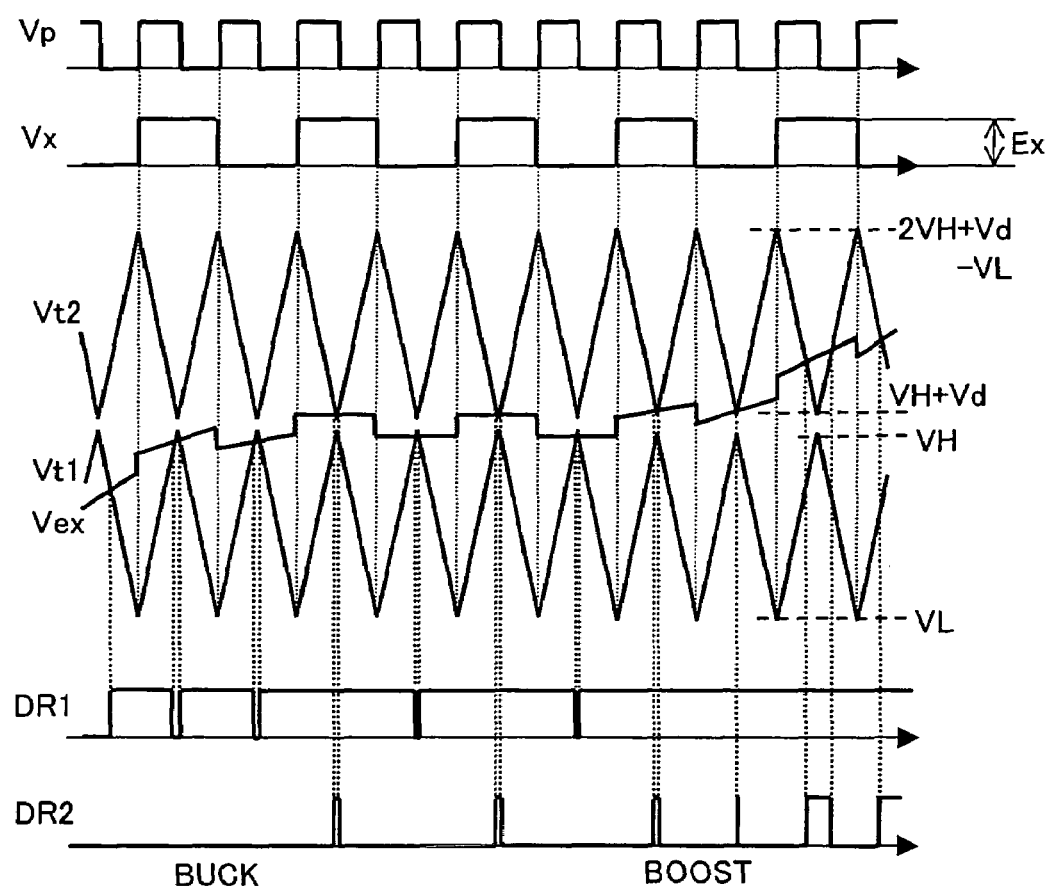
FIG. 8 is a timing chart of the control circuit in the buck-boost converter according to the third embodiment of the present invention.

FIG. 8 shows a timing chart (an operation waveform diagram) of the control circuit 10B according to the third embodiment and indicates the signal waveforms of the pulse signal Vp, the compensatory signal Vx1, the first triangular wave signal Vt1, the second triangular wave signal Vt2, the control signal Vex, the first driving signal DR1, and the second driving signal DR2. As shown in FIG. 8, in the first triangular wave signal Vt1, the rise and fall times are equal to each other, and are also equal to the times in the pulse signal Vp in which the pulse signal Vp is at the high "H" level and at the low "L" level. Although not shown, the compensatory signal generation circuit 13B includes a frequency dividing circuit and an amplifier circuit. The compensatory signal Vx has the frequency obtained by dividing the frequency of the pulse signal Vp by two by the frequency dividing circuit, and the amplitude Ex thereof is set greater than the gap voltage Vd by the amplifier circuit.

In the first half of the chart shown in FIG. 8, the control signal Vex intermittently intersects the first triangular wave signal Vt1 but does not intersect the second triangular wave signal Vt2. The first driving signal DR1 thus controls the first switch 2 in such a manner that the first switch 2 alternates between the on and off operations. On the other hand, since the second driving signal DR2 remains at the low level, the second switch 5 is in the off state. That is, the buck-boost converter according to the third embodiment operates as a buck converter.

In the middle portion of the chart shown in FIG. 8, when the control signal Vex comes to intersect the second triangular wave signal Vt2, the control signal Vex intersects the first triangular wave signal Vt1 and the second triangular wave signal Vt2 alternately (i.e., intersects either the first or second triangular wave signal Vt1 or Vt2 in each switching cycle), because the compensatory signal Vx whose cycle is twice as long as one switching cycle is superimposed on the control signal Vex. Therefore, the cycle, in which the second switch 5 is in the off state and the first switch 2 alternates between the on and off operations, thereby causing the buck-boost converter to operate as a buck converter, and the cycle, in which the first switch 2 is in the on state and the second switch 5 alternates between the on and off operations, thereby causing the buck-boost converter to operate as a boost converter, occur alternately.

Next, in the latter half of the chart shown in FIG. 8, when the control signal Vex does not intersect the first triangular wave signal Vt1 any more, the first driving signal DR1 is always at the high level, thereby causing the first switch 2 to be in the on state. On the other hand, the second driving signal DR2 makes the second switch 5 alternate between the on and off operations. Moreover, as the control signal Vex is raised, the pulse width of the second driving signal DR2 increases. Therefore, the buck-boost converter according to the third embodiment operates as a boost converter.

As described above, in the buck-boost converter according to the third embodiment, as in the buck-boost converter of the first embodiment, increase and decrease of the output DC voltage Vo with respect to the input DC voltage Vi can be controlled. Also, in the transition regions between the operation of the buck converter section 20 and the operation of the boost converter section 25, the duty cycle for the buck converter section 20 and the duty cycle for the boost converter section 25 occur alternately. Therefore, the first switch 2 and the second switch 5 do not perform the on and off operations within one switching cycle, thereby preventing increase in switching loss. This allows the buck converter section 20 and the boost converter section 25 to operate separately, while enabling smooth transitions between the boost operation and the buck operation.

FOURTH EMBODIMENT

Hereinafter, a buck-boost converter according to a fourth embodiment of the present invention will be described with reference to the accompanying drawings.

In the above-described first to third embodiments of the present invention, the compensatory signal Vx superimposed on the error signal Ve is generated by doubling the cycle of the pulse signal Vp. However, the present invention is not limited to the doubled cycle. For example, if a signal having a quadruple cycle so as to be used in other applications can be used, that quadruple-cycle signal may be used as the compensatory signal.

Figure 9:
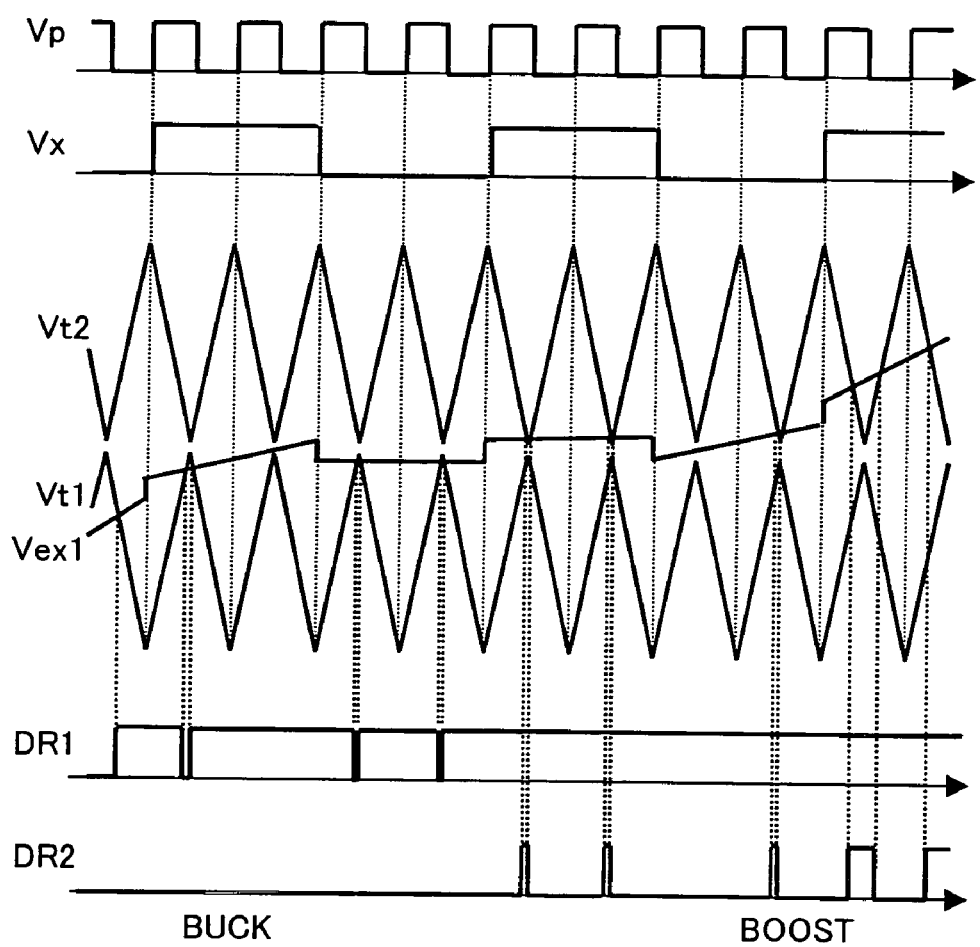
FIG. 9 is a timing chart of a control circuit in a buck-boost converter according to a fourth embodiment of the present invention.

FIG. 9 shows a timing chart (an operation waveform diagram) of the buck-boost converter according to the fourth embodiment. The circuit configuration is almost identical to that of the third embodiment shown in FIG. 7. The buck-boost converter of the fourth embodiment however is different from the buck-boost converter shown in FIG. 7 in that in a compensatory signal generation circuit 13B, the cycle of a pulse signal Vp is quadrupled and the resultant signal having the quadruple cycle is amplified to generate a compensatory signal Vx, which is then superimposed on an error signal Ve to generate a control signal Vex1.

In the chart shown in FIG. 9, particularly in the middle portion thereof, the control signal Vex1 intersects a first triangular wave signal Vt1 and a second triangular wave signal Vt2 in an alternate manner, (in which the control signal Vex1 intersects one of the first and second triangular wave signals Vt1 and Vt2 in two consecutive switching cycles and then intersects the other in the next two consecutive cycles), because the compensatory signal Vx whose cycle is four times as long as one switching cycle is superimposed on the control signal Vex1. Therefore, two cycles, in which the second switch 5 is in the off state and the first switch 2 alternates between the on and off operations, thereby causing the buck-boost converter to operate as a buck converter, and two cycles, in which the first switch 2 is in the on state and the second switch 5 alternates between the on and off operations, thereby causing the buck-boost converter to operate as a boost converter, occur alternately.

As described above, in the buck-boost converter according to the fourth embodiment, as in the buck-boost converter of the third embodiment, increase and decrease of the output DC voltage Vo with respect to the input DC voltage Vi can be controlled. Also, in the transition regions between the operation of the buck converter section and the operation of the boost converter section, the duty cycle for the buck converter section and the duty cycle for the boost converter section occur in an alternate manner (i.e., one of these duty cycles occurs in consecutive two cycles and the other occurs in the next consecutive cycles). Therefore, the first switch and the second switch do not perform the on and off operations within one switching cycle, thereby preventing increase in switching loss. This allows the buck converter section and the boost converter section to operate separately, while enabling smooth transitions between the boost operation and the buck operation.

FIFTH EMBODIMENT

In the buck-boost converters according to the above-described first to fourth embodiments of the present invention, the compensatory signal Vx is generated from the pulse signal Vp. Thus, the compensatory signal Vx is a square wave, but is not limited to a square wave.

Figure 10A:
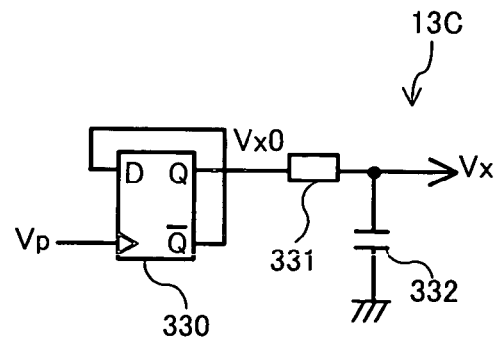
FIG. 10A is a circuit diagram illustrating a compensatory signal generation circuit in a control circuit in a buck-boost converter according to a fifth embodiment of the present invention.
Figure 10B:
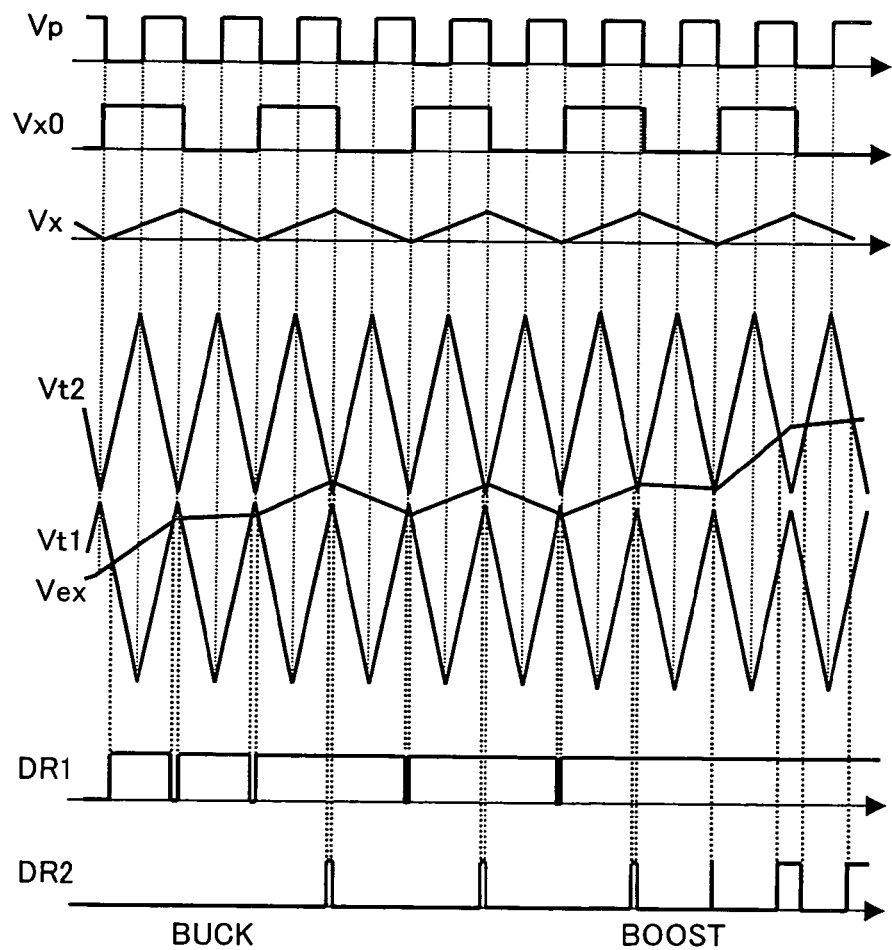
FIG. 10B is a timing chart of the control circuit in the buck-boost converter according to the fifth embodiment of the present invention.

For example, FIG. 10A shows another exemplary configuration for the compensatory signal generation circuit 13B according to the third embodiment, and shows the circuit configuration of a compensatory signal generation circuit 13C in a buck-boost converter according to a fifth embodiment. FIG. 10B shows a timing chart (an operation waveform diagram) of the control circuit. As shown in FIGS. 10A and 10B, a pulse signal Vp is converted into a frequency-divided signal Vx0 by a frequency dividing circuit 330. Then, a triangular-wave compensatory signal Vx is generated from the converted frequency-divided signal Vx0 by an integrator circuit including a resistor 331 and a capacitor 332. The triangular-wave compensatory signal Vx is added to an error signal Ve.

MODIFIED EXAMPLE OF THE FIFTH EMBODIMENT

Figure 11A:
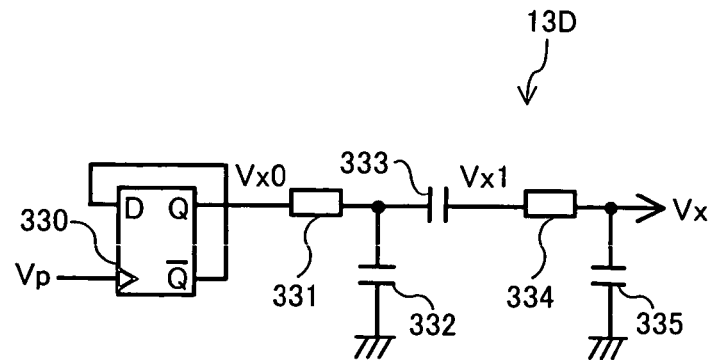
FIG. 11A is a circuit diagram illustrating a compensatory signal generation circuit in a control circuit in a buck-boost converter according to a modified example of the fifth embodiment of the present invention.
Figure 11B:
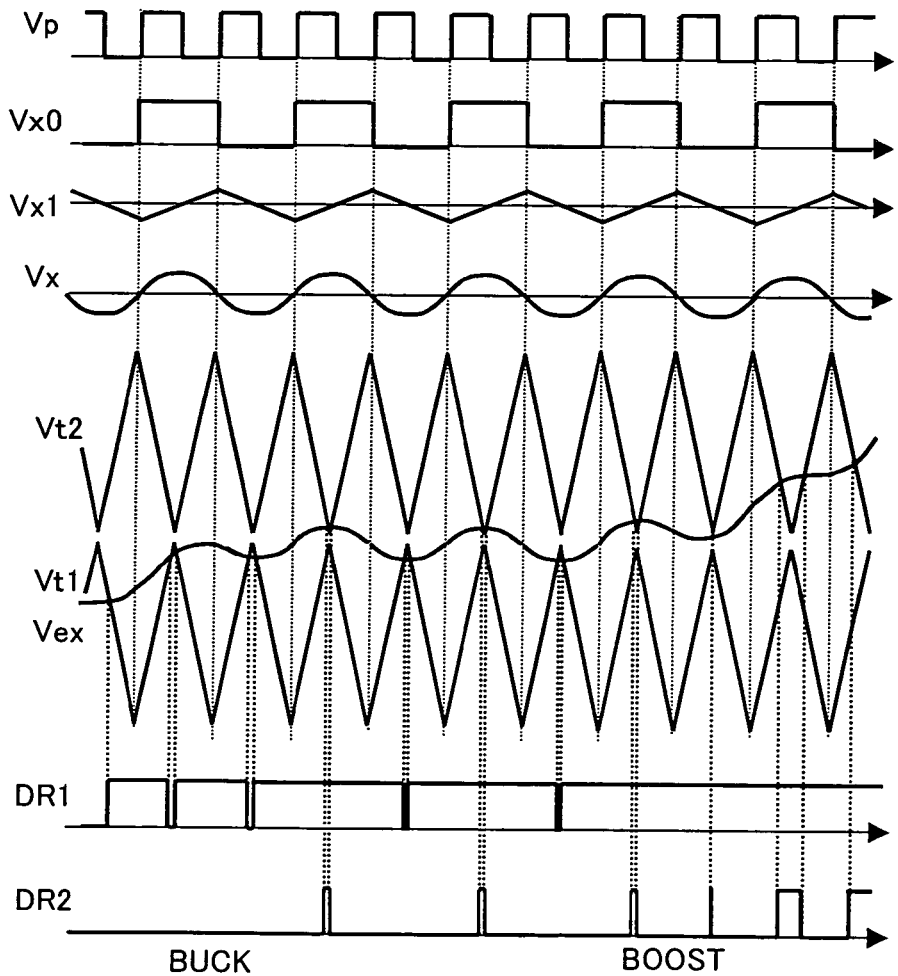
FIG. 11B is a timing chart of the control circuit in the buck-boost converter according to the modified example of the fifth embodiment of the present invention.

FIG. 11A shows still another exemplary configuration for the compensatory signal generation circuit 13B according to the third embodiment, and shows the circuit configuration of a compensatory signal generation circuit 13D in a buck-boost converter according to a modified example of the fifth embodiment. FIG. 11B shows a timing chart (an operation waveform diagram) of the control circuit. As shown in FIGS. 11A and 11B, a pulse signal Vp is converted into a frequency-divided signal Vx0 by a frequency dividing circuit 330, and the converted frequency-divided signal Vx0 is converted into a triangular wave signal by a first integrator circuit including a first resistor 331 and a first capacitor 332. The converted frequency-divided signal Vx0 is passed through a second capacitor 333 to generate a triangular wave signal Vx1 only having an AC component. Furthermore, a sine-wave compensatory signal Vx is generated by a second integrator circuit including a second resistor 334 and a third capacitor 335. This sine-wave compensatory signal Vx is added to an error signal Ve.

In the first to fourth embodiments, since a square-wave signal is used as the compensatory signal Vx, portions in which steep level changes occur are produced periodically in the control signals V1 and V2 generated from the square-wave compensatory signal Vx. When these steep level-change portions intersect the triangular wave signal Vt, the driving signals DR1 and DR2 may become unstable. In the fifth embodiment and the modified example thereof, however, the compensatory signal Vx is a triangular-wave or sine-wave signal, thereby allowing generation of more stable driving signals DR1 and DR2.

Consequently, in the buck-boost converter according to the fifth embodiment or the modified example thereof, not only the same effects as those obtained by the buck-boost converters of the first to fourth embodiments are achieved, but also more stable driving signals DR1 and DR2 can be obtained by changing the compensatory signal Vx from a square wave to a triangular or sine wave.

It should be noted that the triangular-wave or sine-wave compensatory signal Vx may be delayed with respect to the pulse signal Vp as in the first embodiment.

Also, in the first to fifth embodiments, the diodes 3 and 6 are used as the first and second rectifier means, but synchronous rectifier circuits in which the diodes 3 and 6 are replaced with switching devices may be used.

As described above, in the buck-boost converters according to the present invention, the operation of the buck converter section and the operation of the boost converter section can be separated, thereby allowing smooth transitions between the boost operation and the buck operation and hence stabilizing both the buck operation and the boost operation. The buck-boost converters according to the present invention are thus applicable to non-isolated buck-boost converters and the like.

What is claimed is:

1. A buck-boost converter, comprising:
   a buck converter section including a first switch, first rectifier means, and an inductor;
   a boost converter section sharing the inductor and including a second switch, second rectifier means, and smoothing means; and
   a control circuit for generating and outputting a first driving signal for opening and closing the first switch and a second driving signal for opening and closing the second switch, wherein the control circuit includes:
an error amplifier circuit for amplifying an error between an output value from the smoothing means and a predetermined voltage value to thereby generate and output an error signal;
an oscillator circuit for generating and outputting a triangular wave signal having a predetermined cycle;
a compensatory signal generation circuit for generating and outputting a compensatory signal, which oscillates in a cycle that is at least twice the cycle of the triangular wave signal;
a control signal generation circuit for adding together the error signal and the compensatory signal to thereby generate and output a control signal; and
a comparator circuit for comparing the triangular wave signal with the control signal to generate and output the first or second driving signal.

2. The buck-boost converter of claim 1, wherein the control signal generation circuit includes an adder circuit for adding together the error signal and the compensatory signal to thereby generate a first control signal, and a level shift circuit for subtracting from the first control signal an offset equal to or greater than an amplitude of the triangular wave signal to thereby generate a second control signal;
the comparator circuit includes a first comparator circuit for comparing the triangular wave signal with the first control signal to generate the first driving signal, and a second comparator circuit for comparing the triangular wave signal with the second control signal to thereby generate the second driving signal; and
an amplitude of the compensatory signal is greater than a difference between the offset and the amplitude of the triangular wave signal.

3. The buck-boost converter of claim 2, wherein the oscillator circuit includes a pulse signal generation circuit for generating a pulse signal whose first level corresponds to rise of the triangular wave signal and whose second level corresponds to fall of the triangular wave signal; and
the compensatory signal generation circuit includes a frequency dividing circuit, a delay circuit, and an amplifier circuit and generates the compensatory signal by dividing a frequency of the pulse signal and delaying and amplifying a signal obtained by the frequency division.

4. The buck-boost converter of claim 2, wherein the oscillator circuit includes a pulse signal generation circuit for generating a pulse signal whose first level corresponds to rise of the triangular wave signal and whose second level corresponds to fall of the triangular wave signal; and
the compensatory signal generation circuit includes a frequency dividing circuit, a delay circuit, an amplifier circuit, and a first integrator circuit and generates the compensatory signal, which is a triangular-wave signal, by dividing a frequency of the pulse signal, delaying and amplifying a signal obtained by the frequency division, and passing the delayed and amplified signal through the first integrator circuit.

5. The buck-boost converter of claim 2, wherein the oscillator circuit includes a pulse signal generation circuit for generating a pulse signal whose first level corresponds to rise of the triangular wave signal and whose second level corresponds to fall of the triangular wave signal; and
the compensatory signal generation circuit includes a frequency dividing circuit, a delay circuit, an amplifier circuit, a first integrator circuit, and a second integrator circuit and generates the compensatory signal, which is a sine-wave signal, by dividing a frequency of the pulse signal, delaying and amplifying a signal obtained by the frequency division, and passing the delayed and amplified signal through the first and second integrator circuits.

6. The buck-boost converter of claim 1, wherein the error amplifier circuit includes an error amplifier for amplifying the error between the output value from the smoothing means and the predetermined voltage value to thereby generate a first error signal, and a level shift circuit for subtracting from the first error signal an offset equal to or greater than an amplitude of the triangular wave signal to thereby generate a second error signal;
the compensatory signal generation circuit includes a first compensatory signal generation circuit for generating a first compensatory signal, which has an amplitude greater than a difference between the offset and the amplitude of the triangular wave signal and oscillates in a cycle that is at least twice the cycle of the triangular wave signal, and a delay circuit for generating a second compensatory signal which is out of phase with the first compensatory signal;
the control signal generation circuit includes a first adder circuit for superimposing the first compensatory signal on the first error signal to thereby generate a first control signal, and a second adder circuit for superimposing the second compensatory signal on the second error signal to thereby generate a second control signal; and
the comparator circuit includes a first comparator circuit for comparing the triangular wave signal with the first control signal to generate the first driving signal, and a second comparator circuit for comparing the triangular wave signal with the second control signal to output the second driving signal.

7. The buck-boost converter of claim 6, wherein the oscillator circuit includes a pulse signal generation circuit for generating a pulse signal whose first level corresponds to rise of the triangular wave signal and whose second level corresponds to fall of the triangular wave signal; and
the compensatory signal generation circuit includes a first compensatory signal generation circuit, which includes a frequency dividing circuit and an amplifier circuit and generates the first compensatory signal by dividing a frequency of the pulse signal and amplifying a signal obtained by the frequency division, and a second compensatory signal generation circuit, which generates the second compensatory signal that is out of phase with the first compensatory signal by one-half of the cycle of the triangular wave signal.

8. The buck-boost converter of claim 6, wherein the oscillator circuit includes a pulse signal generation circuit for generating a pulse signal whose first level corresponds to rise of the triangular wave signal and whose second level corresponds to fall of the triangular wave signal; and
the compensatory signal generation circuit includes a first compensatory signal generation circuit, which includes a frequency dividing circuit, an amplifier circuit, and a first integrator circuit and generates the first compensatory signal by dividing a frequency of the pulse signal, amplifying a signal obtained by the frequency division, and passing the amplified signal through the first integrator circuit, and a second compensatory signal generation circuit, which generates the second compensatory signal that is out of phase with the first compensatory signal by one-half of the cycle of the triangular wave signal, the first compensatory signal being a triangular-wave signal.

9. The buck-boost converter of claim 6, wherein the oscillator circuit includes a pulse signal generation circuit for generating a pulse signal whose first level corresponds to rise of the triangular wave signal and whose second level corresponds to fall of the triangular wave signal; and the compensatory signal generation circuit includes a first compensatory signal generation circuit, which includes a frequency dividing circuit, an amplifier circuit, a first integrator circuit, and a second integrator circuit and generates the first compensatory signal by dividing a frequency of the pulse signal, amplifying a signal obtained by the frequency division, and passing the amplified signal through the first and second integrator circuits, and a second compensatory signal generation circuit, which generates the second compensatory signal that is out of phase with the first compensatory signal by one-half of the cycle of the triangular wave signal, the first compensatory signal being a sine-wave signal.

10. The buck-boost converter of claim 1, wherein the oscillator circuit includes a triangular-wave signal generation circuit for generating a first triangular wave signal having the predetermined cycle, and an inverting circuit for generating a second triangular wave signal which is the inverse of the first triangular wave signal and does not intersect the first triangular wave signal;

the comparator circuit includes a first comparator circuit for comparing the first triangular wave signal with the control signal to generate the first driving signal, and a second comparator circuit for comparing the second triangular wave signal with the control signal to output the second driving signal; and an amplitude of the compensatory signal is greater than a gap between an oscillation range in which the first triangular wave signal oscillates and an oscillation range in which the second triangular wave signal oscillates.

11. The buck-boost converter of claim 10, wherein the oscillator circuit includes a pulse signal generation circuit for generating a pulse signal whose first level corresponds to rise of the triangular wave signal and whose second level corresponds to fall of the triangular wave signal; and the compensatory signal generation circuit includes a frequency dividing circuit and an amplifier circuit and generates the compensatory signal by dividing a frequency of the pulse signal and amplifying a signal obtained by the frequency division.

12. The buck-boost converter of claim 10, wherein the oscillator circuit includes a pulse signal generation circuit for generating a pulse signal whose first level corresponds to rise of the triangular wave signal and whose second level corresponds to fall of the triangular wave signal; and the compensatory signal generation circuit includes a frequency dividing circuit and a first integrator circuit and generates the compensatory signal, which is a triangular-wave signal, by dividing a frequency of the pulse signal and passing a signal obtained by the frequency division through the first integrator circuit.

13. The buck-boost converter of claim 10, wherein the oscillator circuit includes a pulse signal generation circuit for generating a pulse signal whose first level corresponds to rise of the triangular wave signal and whose second level corresponds to fall of the triangular wave signal; and the compensatory signal generation circuit includes a frequency dividing circuit, a first integrator circuit, and a second integrator circuit and generates the compensatory signal, which is a sine-wave signal, by dividing a frequency of the pulse signal and passing a signal obtained by the frequency division through the first and second integrator circuits.

* * * * *